United States Patent
Ehrlich et al.

(10) Patent No.: US 7,738,723 B2
(45) Date of Patent: Jun. 15, 2010

(54) SYSTEM AND METHOD FOR IMAGE DISPLAY ENHANCEMENT

(75) Inventors: Avshalom Ehrlich, Kibbuts Ramat Hashofet (IL); Zvi Straucher, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 828 days.

(21) Appl. No.: 11/305,012

(22) Filed: Dec. 19, 2005

(65) Prior Publication Data

US 2006/0133687 A1 Jun. 22, 2006

(30) Foreign Application Priority Data

Dec. 19, 2004 (IL) ........................................ 165852

(51) Int. Cl.
*G06K 9/40* (2006.01)
*H04N 5/225* (2006.01)
*H04N 5/238* (2006.01)

(52) U.S. Cl. .................. 382/254; 348/362; 348/365

(58) Field of Classification Search .................. 382/254, 382/260–263, 266; 358/1.9, 3.31, 447, 461, 358/463; 348/606, 624

See application file for complete search history.

(56) References Cited

U.S. PATENT DOCUMENTS

| | | | |
|---|---|---|---|
| 6,611,627 B1 * | 8/2003 | LaRossa et al. | 382/240 |
| 6,771,320 B2 * | 8/2004 | Choi | 348/625 |
| 6,771,793 B1 * | 8/2004 | Yamada | 382/264 |
| 6,791,527 B2 * | 9/2004 | Yoshinaga et al. | 345/102 |
| 6,915,024 B1 * | 7/2005 | Maurer | 382/274 |
| 6,967,692 B1 * | 11/2005 | Kakuya et al. | 348/712 |
| 6,985,185 B1 * | 1/2006 | Crawford et al. | 348/362 |
| 7,253,842 B2 * | 8/2007 | Louie et al. | 348/542 |

* cited by examiner

*Primary Examiner*—Vu Le
*Assistant Examiner*—Andrae S Allison
(74) *Attorney, Agent, or Firm*—Mark M. Friedman

(57) ABSTRACT

A method for displaying digital images on a display device. The method includes obtaining an input image set including one or more input image, processing the input image set to generate an output image set including a number of output images, displaying the output image set in a sequence on the display device at a frame rate in excess of five frames per second. The first and second image-processing transformations and the sequence are chosen such that a time-integrated average luminance in each region of the display over successive frames approximates to the luminance distribution of a corresponding region of the input image set.

17 Claims, 6 Drawing Sheets

FIG. 1

SYSTEM AND METHOD FOR IMAGE DISPLAY ENHANCEMENT

FIELD AND BACKGROUND OF THE INVENTION

The present invention relates to display of still or moving images and, in particular, it concerns systems and methods for enhancing perception of the content of displayed images.

All imaging hardware systems are inherently limited in the level of detail and the fidelity of images they produce. Such limitations include spatial resolution, dynamic pixel range, optical distortions, background noise levels and overall sensitivity. Particularly when pushed to their performance limits in cases of high magnification, poor illumination, motion or other environmental disruptions, image quality may be seriously impaired. Examples of image impairment include, but are not limited to, loss of contrast and blurring. Image degradation may also be caused by subsequent handling of image data such as by data compression and changes of format. For these and other reasons, situations occur in which the details of various still or moving (video) images are not readily perceived by the human eyes.

There exist many image processing techniques which can be useful for emphasizing specific information in a poor quality image. Examples of such processing techniques include, but are not limited to, image sharpening, contrast enhancement and edge detection. Although such techniques are useful for highlighting certain features, they also introduce further distortions into the image. These added distortions may be misleading to the eye and typically cause significant corruption of the overall visual impression perceived by the viewer.

Even where image quality is good, limitations of equipment used for displaying the images sometimes limits the amount of information which can be presented to the eye. For example, certain displays are limited to 8-bit (256 shade) intensity levels, and are therefore unable to reproduce the information in an image stored with a greater dynamic range (such as 16-bit with 65536 shades of intensity).

There is therefore a need for improved systems and methods for enhancing perception of the content of displayed images.

SUMMARY OF THE INVENTION

The present invention is a system and method for enhancing perception of the content of displayed images.

According to the teachings of the present invention there is provided, a method for displaying digital images on a display device comprising: (a) obtaining an input image set including at least one input image; (b) processing the input image set to generate an output image set including a plurality of output images, the processing including: (i) generating a first subset of the output images by applying a first image-processing transformation to input images from the input image set, the image-processing transformation causing a luminance distortion to at least one region of the output image relative to the corresponding region of the input image, and (ii) generating a second subset of the output images by applying a second image processing transformation to input images from the input image set, the second image processing transformation being different from the first image processing transformation; and (c) displaying the output image set in a sequence on the display device at a frame rate in excess of five frames per second, wherein the first and second image-processing transformations and the sequence are chosen such that a time-integrated average luminance in each region of the display over successive frames approximates to the luminance distribution of a corresponding region of the input image set.

According to a further feature of the present invention, the second image processing transformation is a luminance correction function for the first image processing transformation chosen such that, for a given input image, an average of output images generated by the first and second image processing transformations is a faithful reproduction of the given input image.

According to a further feature of the present invention, the sequence includes alternating output images from the first and the second subsets.

According to a further feature of the present invention, the processing includes generating a third subset of the output images by applying a third image processing transformation to input images from the input image set, the third image processing transformation being a luminance-preserving transformation.

According to a further feature of the present invention, the second image processing transformation is a luminance-preserving transformation, the sequence including a majority of frames from the second subset of output images and a minority of frames from the first subset of output images.

According to a further feature of the present invention, the input image set includes only a single input image.

According to a further feature of the present invention, the displaying includes repeating the sequence multiple times.

According to a further feature of the present invention, the input image set includes a plurality of input images making up a video sequence.

According to a further feature of the present invention, the video sequence has an input frame rate, the displaying being performed at a frame rate equal to the input frame rate.

According to a further feature of the present invention, the first and second image processing transformations are applied to different images from the input image set.

According to a further feature of the present invention, the video sequence has an input frame rate, the displaying being performed at a frame rate double the input frame rate.

According to a further feature of the present invention, the first and second image processing transformations are both applied to at least one image from the input image set to generate corresponding output images from the first and second subsets, the corresponding output images being displayed in succession.

According to a further feature of the present invention, the at least one input image has a first number of distinct levels of pixel luminance, and wherein the display provides a second number of distinct levels of pixel luminance less than the first number, wherein the first and second image-processing transformations and the sequence are chosen such that a time-integrated average luminance in each region of the display over successive frames approximates to the distinct luminance levels of the input image.

According to a further feature of the present invention, the at least one input image is a color image including luminance data for each of three colors, the first image processing transformation operating on each of the three colors.

According to a further feature of the present invention, the first image processing transformation includes a contrast enhancement transformation.

According to a further feature of the present invention, the first image processing transformation includes an edge-detection transformation.

According to a further feature of the present invention, the first image processing transformation includes an image sharpening transformation.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system and method for enhancing perception of the content of displayed images.

The principles and operation of systems and methods according to the present invention may be better understood with reference to the drawings and the accompanying description.

Figure 1:
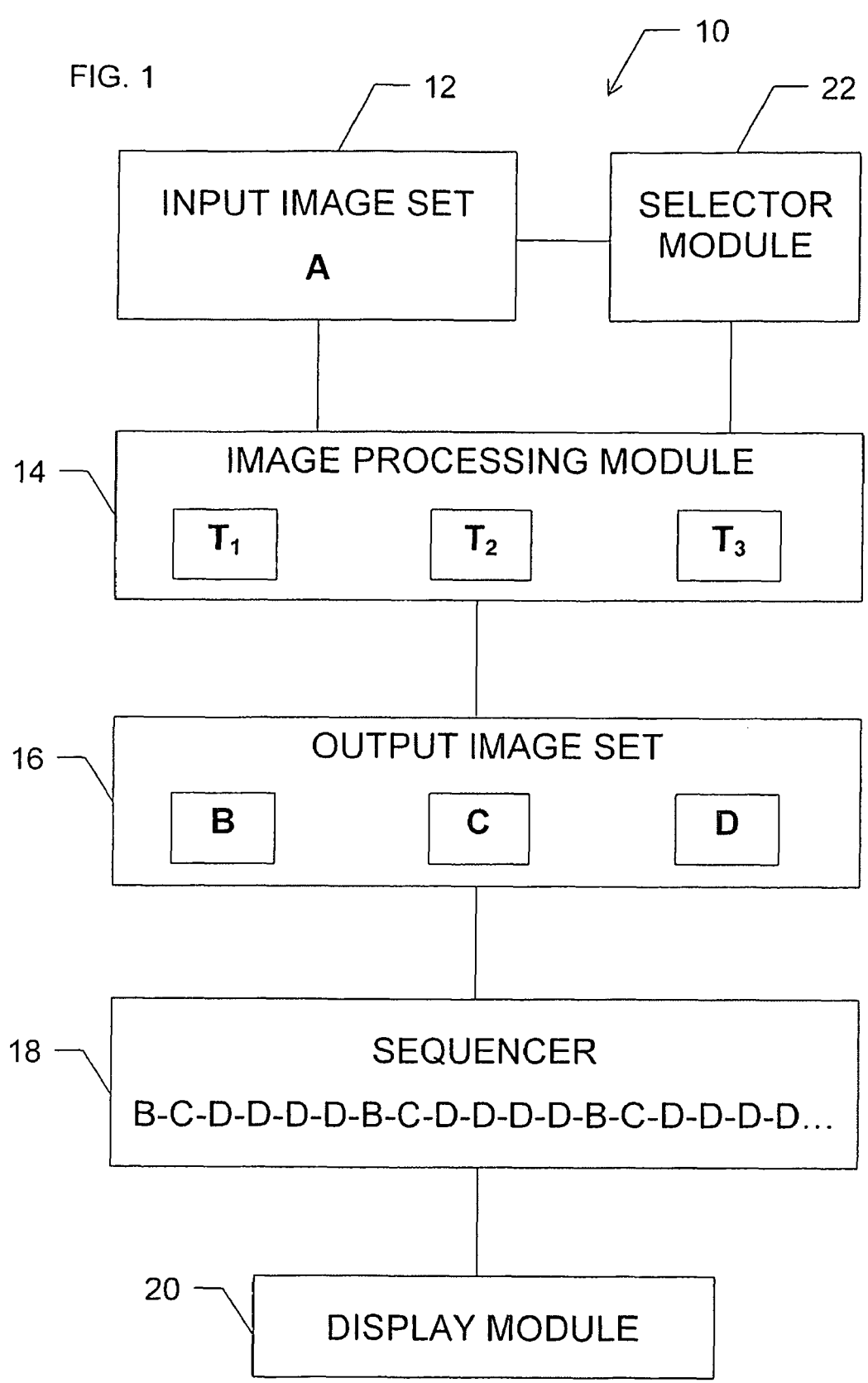
FIG. 1 is a schematic representation of a system, constructed and operative according to the teachings of the present invention, for displaying images to a user.

Referring now to the drawings, FIG. 1 shows schematically a system, generally designated 10, constructed and operative according to the teachings of the present invention, for displaying digital images. In general terms, system 10 includes a source 12 for an input image set A, an image processing module 14 for performing at least two image processing transformations $T_1, T_2, T_3 \ldots$ to each image from the input image set, and an output image set storage device 16 for storing the output images from image processing module 14. A sequencer 18 then supplies the output images in a specific sequence to a display module 20 for display to a user. Most preferably, system 10 also includes a selector module 22 associated with image processing module 14, and most preferably also with input image set source 12, for selecting one of a number of modes of operation.

Operation of system 10, and the corresponding method of the present invention, is generally as follows. Firstly, an input image set including at least one input image is obtained from source 12. The input image set is then processed by module 14 to generate an output image set including a plurality of output images B, C, D for storing in storage device 16. The processing includes generating a first subset B of the output images by applying a first image-processing transformation $T_1$ to input images from the input image set, and generating a second subset C of the output images by applying a second image processing transformation $T_2$, different from the first image processing transformation, to input images from the input image set. The output image set is then supplied by sequencer 18 for display at display module 20 in a sequence at a frame rate in excess of 5 frames per second, and typically in excess of 20 frames per second.

It is a particular feature of preferred implementations of the present invention that at least the first image-processing transformation $T_1$ causes a luminance distortion to at least one region of the output image relative to the corresponding region of the input image, and yet the first and second image-processing transformations and the sequence are chosen such that a time-integrated average luminance in each region of the display over successive frames approximates to the luminance distribution of a corresponding region of the input image set. In other words, at least one of the image processing transformations may be chosen to emphasize certain features of the input image(s) at the expense of luminance level distortion in the corresponding individual frames while the overall dynamic sequence of displayed images shows an average luminance distribution similar to that of the input image set.

It will be immediately appreciated that the present invention provides profound advantages not available in conventional display systems and methods. Specifically, by ensuring that the time-averaged luminance distribution approximates to that of the input image set, overall fidelity to the available source image information is ensured. At the same time, the transient exposure to images processed by various luminance-level-distorting transformations has been found to enhance the perception of various details within the images. This and other advantages of the present invention will become clearer from the following detailed description of various preferred exemplary implementations.

Figure 2A:
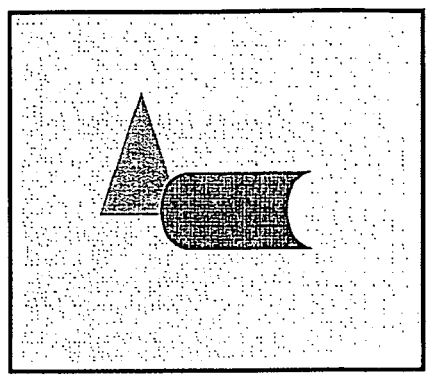
FIGS. 2A and 2B are a schematic original scene and a reduced quality input image of the scene, respectively, for use in illustrating the principles of the present invention.
Figure 2B:
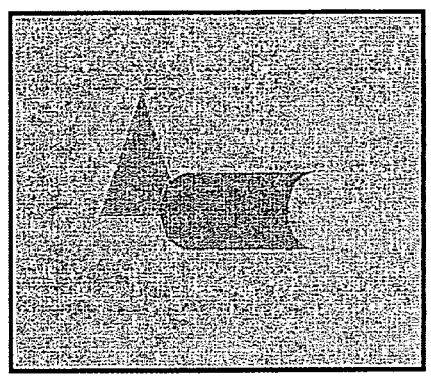

Turning now to the features of the invention in more detail, FIG. 2A shows an abstract "scene" containing two shapes with differing luminance levels on a brighter background. FIG. 2B shows a degraded quality image of the abstract scene of FIG. 2A which will be used as the "input image" in subsequent drawings to illustrate the principles of the present invention.

Figure 3A:
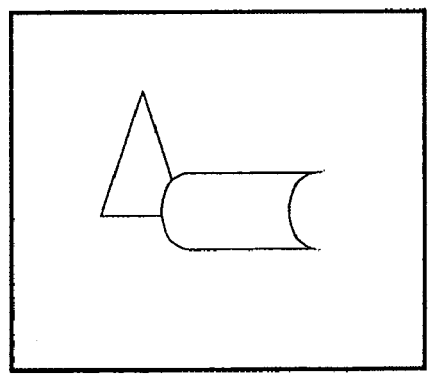
FIG. 3A is a schematic representation of the input image of FIG. 2B processed by an edge-detecting image processing transformation.

FIG. 3A shows a first example of an output image generated by applying an image processing transformation to the input image of FIG. 2B. In this case, the transformation is an edge detection transformation.

Figure 3B:
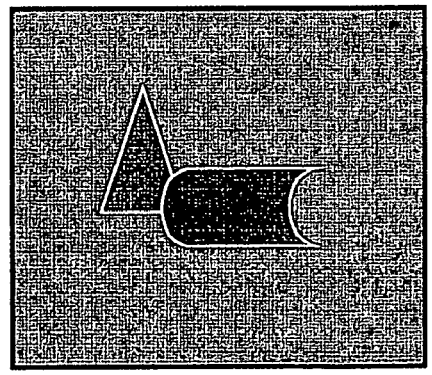
FIG. 3B is a luminance-level correction image for the image of FIG. 3A wherein average pixel luminance values of the images from FIGS. 3A and 3B correspond to the pixel luminance values of the input image of FIG. 2B.
Figure 4:
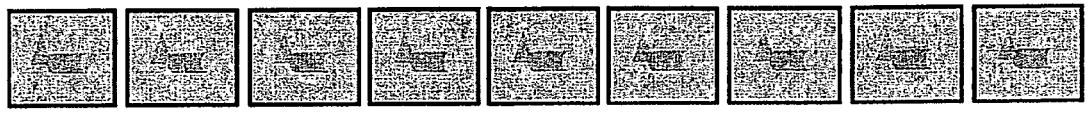
FIG. 4 is a schematic representation of a display frame sequence wherein all of the frames correspond to the image of FIG. 2B.
Figure 5A:
FIG. 5A is a schematic representation of a display frame sequence made up of alternating images from FIGS. 3A and 3B.

FIG. 3B shows an example of an output image generated by applying a second image processing transformation to the input image of FIG. 2B wherein the second image is a luminance correction function for the first image processing transformation. In other words, the second transformation is chosen such that the average of the pixel luminance values of the output images of FIGS. 3A and 3B is a faithful reproduction of the input image of FIG. 2B. Thus, where the output image of FIG. 3A is lighter than the input image of FIG. 2B, this luminance distortion is corrected by FIG. 3B being correspondingly darker. On the other hand, at the edges where FIG. 3A is darker than the input image, FIG. 3B corrects the average luminance by being lighter. The primary consciously perceived visual effect when these output images are displayed alternately in sequence as shown in FIG. 5A at a video frame rate over 20 Hz is of a time-integrated luminance distribution similar to a sequence of the input image as shown in FIG. 4. Nevertheless, the transient exposure to the additional detail in individual frames rendered visible by the edge detection processing has been found to enhance the visual perception of those details.

Figure 5B:
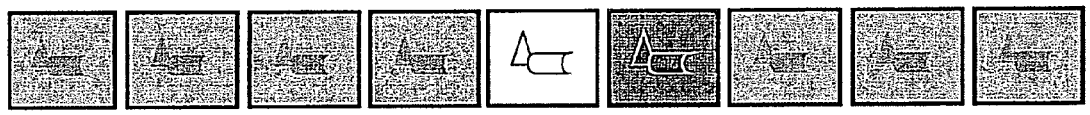
FIG. 5B is a schematic representation of a display frame sequence wherein pairs of images from FIGS. 3A and 3B are spaced among frames corresponding to the input image of FIG. 2B.

In certain cases, particularly in display of real-time video where processing speed limitations may be problematic, it may be preferable to intersperse feature-enhanced and luminance-corrective frames such as those of FIGS. 3A and 3B with "normal" frames, such as is illustrated in FIG. 5B. In this case, the processing preferably includes generating a third subset of the output images by applying a third image processing transformation $T_3$ to input images from the input image set where the third image processing transformation is a luminance-preserving transformation. An example of a "luminance-preserving" transformation is the unity operator, i.e., where the output image is identical to the input image. It should be noted, however, that the input image set and the output image set may have different dimensions and/or data formats such that the luminance-preserving transformation may be a somewhat more complex function which preserves, or at least closely approximates, the luminance levels in individual pixels or groups of pixels which map from corresponding groups of pixels in the input image. Similarly, the luminance-preserving transformation (and the other transformations) may optionally include various correction factors for counteracting non-uniform response characteristics of the display device or other limitations of the display arrangements.

Parenthetically, it will be appreciated that the ten "luminance" as used in this context refers to relative levels of luminance between two extreme values defined by the format of the image data. Clearly, the actual luminance of the output images as appearing on a display will vary as a function of the display properties and settings.

Figure 5C:
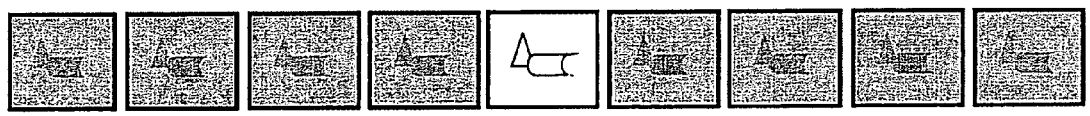
FIG. 5C is a schematic representation of a display frame sequence wherein the image of FIG. 3A is spaced among frames corresponding to the input image of FIG. 2B.

It should also be noted that, if the occurrence of the feature-enhanced frames is sufficiently sparse amongst a majority of "normal" frames, the luminance-corrective frame may optionally be omitted entirely as illustrated in FIG. 5C. As a result of the sparse distribution, the overall affect of the feature-enhanced frame on the average luminance distribution of the sequence is sufficiently small that the overall luminance distribution perceived by the human eye is not significantly changed. Depending upon the type of feature-enhanced processing used, it is generally preferable for the feature-enhanced luminance-distorting frames to occur no more than once in about 10 frames, and more typically no more than once in about 20 frames.

It should be noted that the invention is applicable both to "still" images where the input image set typically includes only a single input image and to "moving" images in the form of video sequences. In the case of a still image, the input image set source 12 may be a camera, a frame grabber for obtaining single frames from an external video source, or may be any suitable data storage device in which the image to be displayed has been stored. For display of still images, each image processing transformation is applied to the same source image. Sequencer 18 then typically displays a given sequence of the output image set repeated multiple times, or in an endless loop for as long as the system is operated. Since the still input does not define a frame rate, the output display may be operated at a wide range of frame rates. By way of a non-limiting example, a normal video frame rate of about 60 cycles per second may be used.

Figure 6:
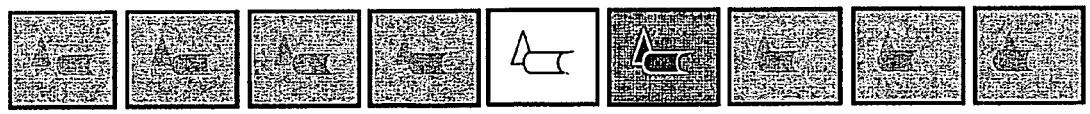
FIG. 6 is a schematic representation of a display frame sequence similar to FIG. 5B applied to an input sequence of video frames.

In the case of video input, the source 12 may be a real-time video camera or any suitable data storage device in which the video frame sequence to be displayed has been stored. An illustration of the application of the invention to a video frame sequence is shown in FIG. 6. In the case shown here, the implementation parallels that of FIG. 5B for stills. Clearly, the other implementations mentioned with reference to FIGS. 5A and 5C are also possible.

Since a video input inherently defines a source frame rate, the output display frame rate should be chosen appropriately to maintain the output speed of the video. According to a first preferred option, the display frame rate is equal to the input frame rate. In this case, the first and second image processing transformations $T_1$ and $T_2$ are typically applied to different images from the input image set. So long as the motion within the images between successive frames is relatively small, the display of a luminance-correcting frame based upon an input image adjacent in the video to the image used in a feature-enhancing transformation is typically still effective to achieve the desired average luminance distribution over a series of frames.

According to an alternative preferred implementation, the display frame rate may be double the input frame rate. This allows for both first and second image processing transformations $T_1$ and $T_2$ to be performed on exactly the same input image and displayed in sequence within the time-slot of the original single frame. Optionally, the aforementioned frame rate doubling may be transient, with a sequence of "normal" frames (i.e., processed with a luminance-preserving transformation) being displayed at the original frame rate between occurrences of the feature-enhanced and luminance-corrective frames.

With regard to the remaining hardware employed to implement the present invention, it will be clear that the image processing, sequencing and display functions may readily be implemented using standard PC hardware operating under a suitable operating system with accompanying software, and including suitable display driving hardware and/or software. Similarly, a general purpose graphics workstation may be used. Where applied to an existing hardware system with a display, the system of the present invention may advantageously be packaged as a stand-alone adapter box deployed in-line with the image display to the existing hardware.

Although the invention has been illustrated to this point by way of example using a feature-enhancing transformation based on edge detection, it should be noted that the invention can be implemented using substantially any type of image processing which is found to enhance perception of details or features of the input image set. Examples of suitable known feature-enhancing image processing techniques include, but are not limited to: contrast enhancement, edge detection, and sharpening or de-blurring of various types. In cases where a specific cause of image degradation is known, various other deconvolution functions may be specially tailored to address the resulting degradation and recover additional information from the input images.

Figure 7A:
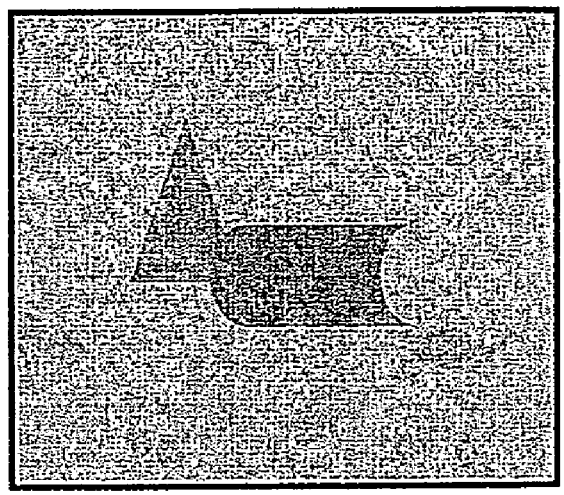
FIG. 7A is an input image similar to FIG. 2B.
Figure 7B:
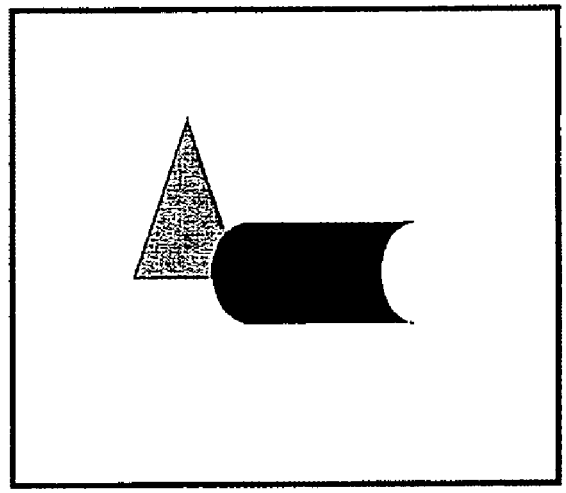
FIG. 7B is a schematic representation of the input image of FIG. 7A processed by a contrast-enhancing image processing transformation.
Figure 7C:
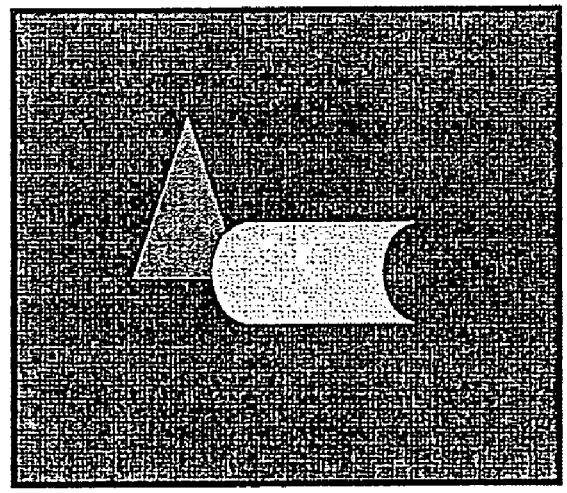
FIG. 7C is a luminance-level correction image for the image of FIG. 7B wherein average pixel luminance values of the images from FIGS. 7B and 7C correspond to the pixel luminance values of the input image of FIG. 7A.
Figure 8:
FIG. 8 is a schematic representation of a display frame sequence wherein pairs of images from FIGS. 7B and 7C are spaced among frames corresponding to the input image of FIG. 7A.

By way of a second non-limiting example, FIGS. 7A-7C and 8 illustrate an implementation of the invention using a contrast-enhanced transformation. Specifically, FIG. 7A again reproduces the input image sample of FIG. 2B (and an output image processed by a luminance-preserving transformation) while FIG. 7B shows the corresponding output image after application of a contrast-enhancement transformation. FIG. 7C shows the results of the corresponding luminance-correcting transformation, i.e., such that the average luminance of FIGS. 7B and 7C corresponds to the luminance distribution of FIG. 7A. FIG. 8 shows a sequence of output images where the frames of FIGS. 7B and 7C are displayed in succession within a sequence of "normal" frames. Clearly, the frames of FIGS. 7B and 7C may optionally be displayed alone in alternation in a manner similar to the sequence of FIG. 5A above.

In this context, it should be noted that a wide range of conventional and non-conventional contrast enhancement algorithms may be used for implementing the present invention. The non-conventional algorithms are typically algorithms which would be unacceptable for normal image-processing software applications due to luminance distortion and/or artifacts introduced into the processed image, but which become useful in the context of the present invention due to the luminance-correcting feature which compensates for such distortions. Two such non-convention contrast enhancement algorithms will now be briefly described by way of non-limiting preferred examples.

According to a first algorithm, a first image has luminance levels from 0 to 50% in the source image spread over the range 0 to 100% while luminance levels over 50% are mapped to 100% intensity. Then, in the compensating image, values up to 50% are mapped to 0% while the values from 50-100% are spread over the range 0 to 100%. The average values over the two images are equal to the input image pixel values.

According to a second algorithm, all pixels with even luminance values are incremented by a fixed or variable amount and/or all pixels with odd luminance values are decreased by the same amount. In a second corrective frame, each increment is replaced by an equal decrease and vice versa. Where values in the output frames would exceed the permitted values, both the increment and the decrease are truncated as necessary. The result is that, in each image, adjacent luminance levels are converted into significantly spread levels. Nevertheless, the average luminance distribution of the sequence of output images remains true to the original input image.

Optionally, additional image analysis may be used to modify the contrast enhancement algorithms. For example, the spatial proximity of pixels may be used as a parameter in choosing the increment/decrement used for the second algorithm such that adjacent pixels with close luminance levels have their values incremented/decremented to enhance contrast while higher contrast regions of the image are not incremented/decreased (or use smaller increments) despite the fact that similar luminance levels exist in other regions of the image.

Figure 9:
FIG. 9 is a schematic representation of a display frame sequence wherein pairs of images from FIGS. 3A and 3B and from FIGS. 7B and 7C are spaced among frames corresponding to the input image of FIG. 7A.

Turning now to FIG. 9, it will be noted that multiple feature-enhancement transformations may be used together. In this example, the edge-detection based pair of output images from FIGS. 3A and 3B are combined in a sequence with the contrast-enhancement based output images of FIGS. 7B and 7C. In certain cases, depending upon the dynamic range of the distortions introduced, it may be possible to combine the luminance-correcting frames for two different transformations into a single corrective frame.

Referring briefly back to FIG. 1, it will be noted that selector module 22 preferably allows automatic or manual selection between a plurality of different operating modes of the system. By way of example, selector module may allow selection of the type of image processing transformations to be used. This may be in the form of a number of user input controls (switches or the like) which allow the user to introduce feature-enhancing frames generated by one or more processing technique discussed above. Similarly, the selector module may allow choice between modes of display sequencing such as those of FIGS. 5A-5C. According to an alternative preferred embodiment, selector module 22 may be an automated module which performs pre-processing calculations on one or more of the input frames to determine automatically which processing technique or techniques are optimal for revealing features of the input images. Techniques for automatic selection of processing techniques on the basis of input image characteristics are well known in the art and are commonly used in popular photographic processing software packages as a basis for automated "photo optimizer" features.

Figure 10:
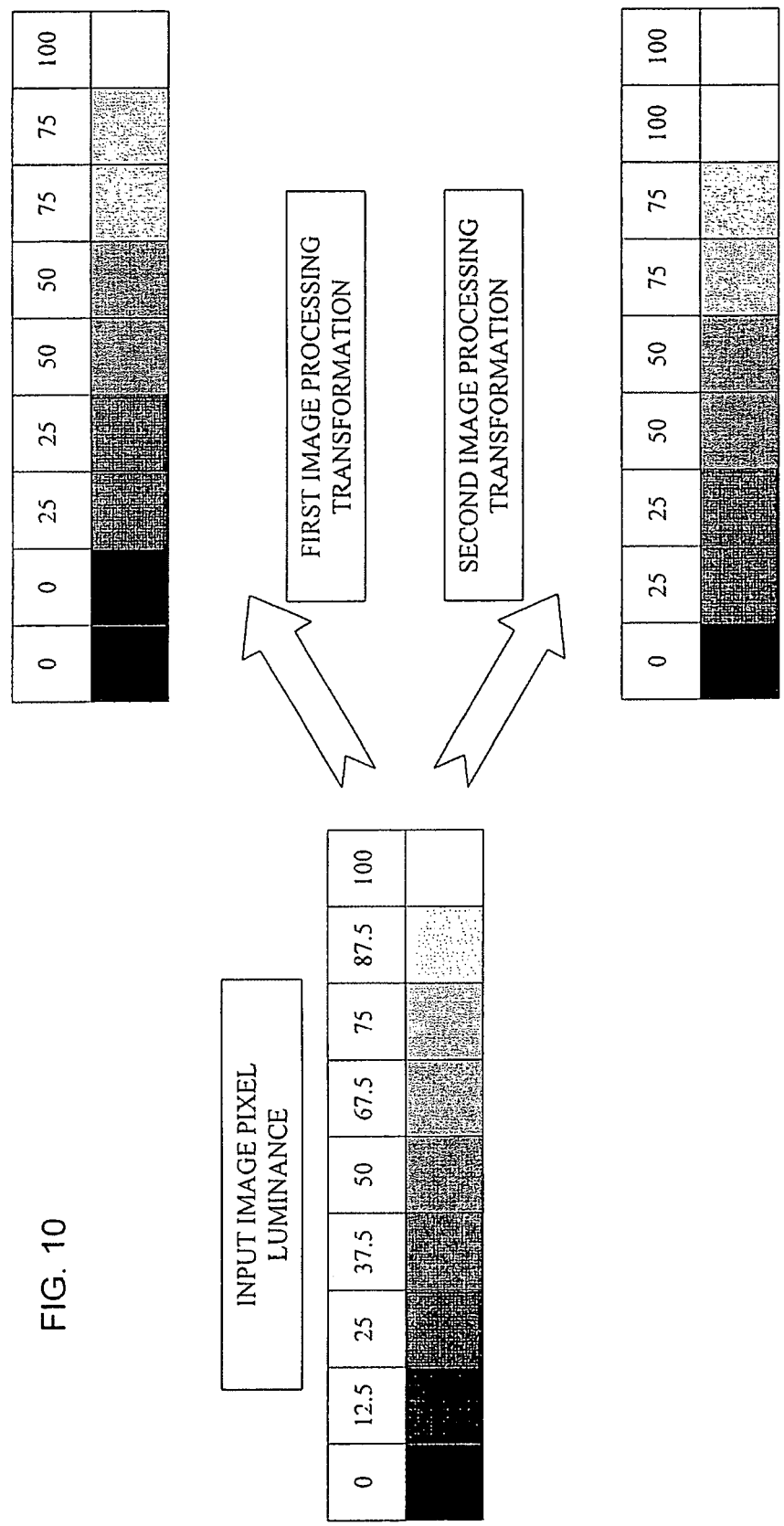
FIG. 10 is a schematic illustration of a luminance level mapping according to the teachings of the present invention for transforming an input image for display on a display module having fewer luminance levels than the input image.

Turning now to FIG. 10, this illustrates the principle of a further implementation of the present invention for addressing the limitations of display systems with small dynamic range. As mentioned in the background to the invention, even when input image quality is high, display limitations sometimes occur as a result of hardware limitations and the like. For example, certain displays are limited to 8-bit (256 shade) intensity levels, and are therefore unable to reproduce faithfully the information in an image stored with a greater dynamic range (such as 16-bit with 65536 shades of intensity). The squashing together of the luminance levels in the display results in a loss of data from the original input image and may result in distortion or loss of certain features and details of the displayed image.

The present invention addresses this problem by providing image processing transformation pairs (or triplets etc. if required) in which certain luminance levels are processed to generate different luminance level values in two different output images such that the average luminance when the output images are displayed in sequence approximates to the distinct luminance levels of the input image.

This principle of operation is illustrated schematically in FIG. 10 where the left side represents an example with 9 distinct luminance level values for pixels in the input image set having intensity values in increments of 12.5% from 0 to 100%. The right side of the figure represents two image processing transformations, each mapping the 9 input image luminance levels to 4 output luminance levels having increments of 25%. In each case, the intermediate luminance level values of the input image which cannot be faithfully reproduced by the output display are mapped to different levels in the two output frames such that, when shown in sequence on the display, the perceived time-averaged luminance of pixels with those values will approximate more closely to the input image luminance level than would otherwise be possible. For example, pixels with 12% intensity in the input image are mapped in a first subset of the output images to 0% intensity and in a second subset to 25% intensity. When these images are displayed alternately in the output sequence, the perceived result approximates closely to the desired 12.5%. Clearly, three or more transformations may be used to split single frame information into three or more output frames so as to achieve higher effective dynamic resolution with two, three or more effective luminance levels between each real output intensity level of the display.

It should be noted that this luminance level interpolation need not be performed using adjacent intensity levels of the display. For example, this aspect of the present invention may be combined with the other detail-enhanced transformation aspects described above. Thus, for example, the image pairs of FIGS. 3A and 3B or 7B and 7C may be modified for display according to the principles described here with reference to FIG. 10. This may result in an input intensity level of 37.5% being approximated in certain cases by successive frames with values of 0% and 75% intensity.

Finally, with reference to all of the above description, it should be noted that the present invention is equally applicable both to monochrome and color images and displays. In cases where the input image is a color image, the image processing transformations most preferably operate on the luminance data for each of the three colors.

It will be appreciated that the above descriptions are intended only to serve as examples, and that many other embodiments are possible within the scope of the present invention as defined in the appended claims.

What is claimed is:

1. A method for displaying digital images on a display device comprising:
   (a) obtaining an input image set including at least one input image;
   (b) processing said input image set to generate an output image set including a plurality of output images, said processing including:
      (i) generating a first subset of said output images by applying a first image-processing transformation to input images from said input image set, said image-processing transformation causing a luminance distortion to at least one region of said output image relative to the corresponding region of the input image, and
      (ii) generating a second subset of said output images by applying a second image processing transformation to input images from said input image set, said second image processing transformation being different from said first image processing transformation, said second subset being distinct from said first subset; and
   (c) displaying said output image set in a sequence on the display device at a frame rate in excess of five frames per second, said sequence including images from said first subset interspaced with images from said second subset,
wherein said first and second image-processing transformations and said sequence are chosen such that a time-integrated average luminance in each region of the display over successive frames approximates to the luminance distribution of a corresponding region of said input image set.

2. The method of claim 1, wherein said second image processing transformation is a luminance correction function for said first image processing transformation chosen such that, for a given input image, an average of output images generated by said first and second image processing transformations is a faithful reproduction of the given input image.

3. The method of claim 2, wherein said sequence includes alternating output images from said first and said second subsets.

4. The method of claim 2, wherein said processing includes generating a third subset of said output images by applying a third image processing transformation to input images from said input image set, said third image processing transformation being a luminance-preserving transformation.

5. The method of claim 1, wherein said second image processing transformation is a luminance-preserving transformation, said sequence including a majority of frames from said second subset of output images and a minority of frames from said first subset of output images.

6. The method of claim 1, wherein said input image set includes only a single input image.

7. The method of claim 6, wherein said displaying includes repeating said sequence multiple times.

8. The method of claim 1, wherein said input image set includes a plurality of input images making up a video sequence.

9. The method of claim 8, wherein said video sequence has an input frame rate, said displaying being performed at a frame rate equal to said input frame rate.

10. The method of claim 9, wherein said first and second image processing transformations are applied to different images from said input image set.

11. The method of claim 8, wherein said video sequence has an input frame rate, said displaying being performed at a frame rate double said input frame rate.

12. A method for displaying digital images on a display device comprising:
   (a) obtaining an input image set including a plurality of input images making up a video sequence having an input frame rate;
   (b) processing said input image set to generate an output image set including a plurality of output images, said processing including:
      (i) generating a first subset of said output images by applying a first image-processing transformation to input images from said input image set, said image-processing transformation causing a luminance distortion to at least one region of said output image relative to the corresponding region of the input image, and
      (ii) generating a second subset of said output images by applying a second image processing transformation to input images from said input image set, said second image processing transformation being different from said first image processing transformation; and
   (c) displaying said output image set in a sequence on the display device at a frame rate in excess of five frames per second, at least part of said sequence being displayed at a frame rate double said input frame rate,
wherein said first and second image-processing transformations and said sequence are chosen such that a time-integrated average luminance in each region of the display over successive frames approximates to the luminance distribution of a corresponding region of said input image set,
and wherein said first and second image processing transformations are both applied to at least one image from said input image set to generate corresponding output images from said first and second subsets, said corresponding output images being displayed in succession.

13. A method for displaying digital images on a display device comprising:
   (a) obtaining an input image set including at least one input image;
   (b) processing said input image set to generate an output image set including a plurality of output images, said processing including:
      (i) generating a first subset of said output images by applying a first image-processing transformation to input images from said input image set, said image-processing transformation causing a luminance distortion to at least one region of said output image relative to the corresponding region of the input image, and generating a second subset of said output images by applying a second image processing transformation to input images from said input image set, said second image processing transformation being different from said first image processing transformation; and (c) displaying said output image set in a sequence on the display device at a frame rate in excess of five frames per second, wherein said first and second image-processing transformations and said sequence are chosen such that a time-integrated average luminance in each region of the display over successive frames approximates to the luminance distribution of a corresponding region of said input image set, and wherein said at least one input image has a first number of distinct levels of pixel luminance, and wherein the display provides a second number of distinct levels of pixel luminance less than said first number, wherein said first and second image-processing transformations and said sequence are chosen such that a time-integrated average luminance in each region of the display over successive frames approximates to the distinct luminance levels of the input image.

14. The method of claim 1, wherein said at least one input image is a color image including luminance data for each of three colors, said first image processing transformation operating on each of said three colors.

15. The method of claim 1, wherein said first image processing transformation includes a contrast enhancement transformation.

16. The method of claim 1, wherein said first image processing transformation includes an edge-detection transformation.

17. The method of claim 1, wherein said first image processing transformation includes an image sharpening transformation.

* * * * *

UNITED STATES PATENT AND TRADEMARK OFFICE
CERTIFICATE OF CORRECTION

PATENT NO. : 7,738,723 B2  Page 1 of 1
APPLICATION NO. : 11/305012
DATED : June 15, 2010
INVENTOR(S) : Ehrlich et al.

It is certified that error appears in the above-identified patent and that said Letters Patent is hereby corrected as shown below:

Column 11, line 4 claim 13 should be corrected as follows:

Insert the number --(ii)-- at the beginning of the line before "generating a second subset of said output images..."

Signed and Sealed this

Seventeenth Day of August, 2010

David J. Kappos
*Director of the United States Patent and Trademark Office*